United States Patent
Wu

(10) Patent No.: US 12,334,747 B2
(45) Date of Patent: Jun. 17, 2025

(54) WIRELESS CHARGING RECEPTION CIRCUIT, METHOD, ELECTRONIC DEVICE AND WIRELESS CHARGING SYSTEM FOR TRANSMITTING ELECTRIC ENERGY THROUGH ELECTROMAGENTIC INDUCTION TO CHARGE A BATTERY

(71) Applicant: Beijing Xiaomi Mobile Software Co., Ltd., Beijing (CN)

(72) Inventor: Kaiqi Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 617 days.

(21) Appl. No.: 17/587,692

(22) Filed: Jan. 28, 2022

(65) Prior Publication Data

US 2023/0023680 A1    Jan. 26, 2023

(30) Foreign Application Priority Data

Jul. 22, 2021    (CN) .......................... 202110833062.0

(51) Int. Cl.
*H02J 50/12*    (2016.01)
*H02J 7/00*    (2006.01)
*H02J 50/40*    (2016.01)
*H02M 7/219*    (2006.01)

(52) U.S. Cl.
CPC .......... *H02J 50/12* (2016.02); *H02J 7/00712* (2020.01); *H02J 50/402* (2020.01); *H02M 7/219* (2013.01)

(58) Field of Classification Search
CPC ..................................... H02J 50/12
USPC ....................................... 320/108
See application file for complete search history.

(56) References Cited

U.S. PATENT DOCUMENTS

| | | | |
|---|---|---|---|
| 11,330,981 B2* | 5/2022 | Andersen | A61B 5/686 |
| 2013/0162203 A1* | 6/2013 | Kamata | H02J 7/0049 |
| | | | 320/108 |
| 2017/0040846 A1 | 2/2017 | Sankar | |
| 2018/0048185 A1 | 2/2018 | Hwang et al. | |
| 2020/0321809 A1 | 10/2020 | Ren et al. | |
| 2020/0412176 A1* | 12/2020 | Choi | H02J 50/12 |
| 2021/0083528 A1* | 3/2021 | Stingu | G06F 1/1635 |

FOREIGN PATENT DOCUMENTS

| | | |
|---|---|---|
| EP | 3145049 A1 | 3/2017 |
| JP | 2005-027400 A | 1/2005 |
| KR | 1020140121200 A | 10/2014 |
| WO | 2013/103756 A1 | 7/2013 |

OTHER PUBLICATIONS

Extended European Search Report dated Aug. 11, 2022 for European Patent Application No. 22153698.0.

* cited by examiner

*Primary Examiner* — Yalkew Fantu
(74) *Attorney, Agent, or Firm* — Volpe Koenig

(57) ABSTRACT

A wireless charging reception circuit, a method, electronic device and a wireless charging system are described. In the wireless charging reception circuit, a control circuit may control a rectifying circuit to rectify electric signals transmitted by a first resonance circuit and/or a second resonance circuit. Since the rectifying circuit outputs different voltages after rectifying the electric signals transmitted by the different resonance circuits, the control circuit may controls the rectifying circuit to rectify the electric signals transmitted by the different resonance circuits to adjust the output voltages of the rectifying circuit.

17 Claims, 13 Drawing Sheets

WIRELESS CHARGING RECEPTION CIRCUIT, METHOD, ELECTRONIC DEVICE AND WIRELESS CHARGING SYSTEM FOR TRANSMITTING ELECTRIC ENERGY THROUGH ELECTROMAGENTIC INDUCTION TO CHARGE A BATTERY

CROSS REFERENCE TO RELATED APPLICATION

The present application is based upon and claims priority to Chinese Patent Application No. 202110833062.0, filed on Jul. 22, 2021, the entire contents of which are incorporated herein by reference.

BACKGROUND

Wireless power transmission (WPT) is a technology for transmitting electric energy with coupled electromagnetic fields as media so as to charge a battery.

In related technologies, a wireless charging system generally includes: a primary resonance circuit, a secondary resonance circuit and a rectifying circuit. The primary resonance circuit may transmit alternating currents to the secondary resonance circuit through an electromagnetic induction mode, and the rectifying circuit may charge a battery after rectifying the alternating currents.

SUMMARY

The present application relates to the technical field of wireless charging, in particular to a wireless charging reception circuit, an electronic device and a wireless charging system.

In one aspect, the present application provides a wireless charging reception circuit, including: a first resonance circuit, a second resonance circuit, a rectifying circuit and a control circuit.

The first resonance circuit is connected with the rectifying circuit, and the first resonance circuit receives an electric signal transmitted by a primary resonance circuit through an electromagnetic induction mode and outputs the received electric signal to the rectifying circuit; the second resonance circuit is connected with the rectifying circuit, and the second resonance circuit receives an electric signal transmitted by the primary resonance circuit through an electromagnetic induction mode and outputs the received electric signal to the rectifying circuit; and the rectifying circuit is connected with the control circuit and a battery, and the rectifying circuit rectifies the electric signal transmitted by the first resonance circuit and/or the electric signal transmitted by the second resonance circuit based on control of the control circuit and charge the battery based on a rectified electric signal.

In another aspect, the present application provides another wireless charging reception circuit. The wireless charging reception circuit includes: a first resonance circuit, a tuning circuit, a rectifying circuit and a control circuit.

The first resonance circuit is connected with the rectifying circuit, and the first resonance circuit receives an electric signal transmitted by a primary resonance circuit through an electromagnetic induction mode and outputs the received electric signal to the rectifying circuit; the tuning circuit is connected with the first resonance circuit and the rectifying circuit, and the tuning circuit is connected with the first resonance circuit in series to form a series resonance circuit; and the rectifying circuit is connected with the control circuit and a battery, and the rectifying circuit rectifies an electric signal transmitted by the first resonance circuit or an electric signal transmitted by the series resonance circuit based on control of the control circuit and charge the battery based on a rectified electric signal.

In yet another aspect, the present application provides a wireless charging control method, applied to a control circuit in a wireless charging reception circuit. The wireless charging reception circuit includes: a first resonance circuit, a second resonance circuit and a rectifying circuit, the first resonance circuit receives an electric signal transmitted by a primary resonance circuit through an electromagnetic induction mode, and the second resonance circuit receives the electric signal transmitted by the primary resonance circuit through the electromagnetic induction mode; and the method includes: outputting, by the control circuit, a control signal to the rectifying circuit so as to control the rectifying circuit to rectify an electric signal transmitted by the first resonance circuit and/or an electric signal transmitted by the second resonance circuit and charge a battery based on a rectified electric signal.

In further another aspect, the present application provides a wireless charging control method, applied to a control circuit in a wireless charging reception circuit. The wireless charging reception circuit includes: a first resonance circuit, a tuning circuit and a rectifying circuit, the first resonance circuit receives an electric signal transmitted by a primary resonance circuit through an electromagnetic induction mode, and the tuning circuit is connected with the first resonance circuit in series to form a series resonance circuit; and the method includes: outputting, by the control circuit, a control signal to the rectifying circuit so as to control the rectifying circuit to rectify an electric signal transmitted by the first resonance circuit or an electric signal transmitted by the series resonance circuit and charge a battery based on a rectified electric signal.

In further another aspect, the present application provides an electronic device. The electronic device includes: any wireless charging reception circuit according to the above aspects, and a battery. The wireless charging reception circuit is connected with the battery and charges the battery.

In further another aspect, the present application provides a wireless charging system, including: power transmitting equipment and the electronic device according to the above aspects: the power transmitting equipment includes a primary resonance circuit, and the primary resonance circuit transmits an electric signal to a resonance circuit in the electronic device through an electromagnetic induction mode.

BRIEF DESCRIPTION OF THE DRAWINGS

In order to explain technical solutions in examples of the present application more clearly, the following will briefly introduce the drawings referred to in the description of the examples. The drawings in the following description are only examples of the present application, and for those of ordinary skill in the art, other drawings can be obtained from these drawings without further invention.

Figure 1:
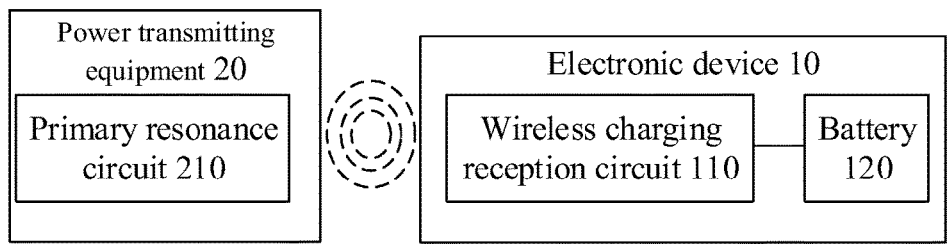
FIG. 1 is a schematic structural diagram of a wireless charging system provided by an example of the present application.

Reference labels in the drawings are explained as follows:
10—electronic device, and 20—power transmitting equipment;
110—wireless charging reception circuit, 120—battery, 130—first filtering circuit, 140—voltage converting circuit, 150—second filtering circuit, and 210—primary resonance circuit;
111—first resonance circuit, 112—second resonance circuit, 113—rectifying circuit, 114—control circuit, and 115—tuning circuit;
device identifiers in the first resonance circuit 111: L1—first induction coil, and C1—first capacitor;
device identifiers in the second resonance circuit 112: L2—second induction coil, and C2—second capacitor;
device identifiers in the rectifying circuit 113: B1—rectifier bridge, D1—first semiconductor device, D2—second semiconductor device, D3—third semiconductor device, D4—fourth semiconductor device, D5—fifth semiconductor device, and D6—sixth semiconductor device;
device identifiers in the first filtering circuit 130: C3—third capacitor; and
device identifiers in the second filtering circuit 150: C4—fourth capacitor.

DETAILED DESCRIPTION

In order to make the objectives, technical solutions and advantages of the present application more clear, the present application will be further described in detail below in combination with the accompanying drawings.

The terms used in the embodiment part of the present application are only used to explain examples of the present application and not intended to limit the present application. Unless otherwise defined, technical or scientific terms used in the embodiments of the present application shall have the ordinary meanings understood by those ordinarily skilled in the art to which the present application pertains. The words "first", "second", "third" and the like used in the specification and the claims of the present application do not indicate any order, quantity or importance, but are only used to distinguish different components. As such, nor "one" or "a" or similar words indicate quantity limitations, but indicate at least one. The words "comprise" or "include" or the like indicate that an element or item appearing before "comprise" or "include" covers listed elements or items appearing after "comprise" or "include" and equivalents of them, and do not exclude other elements or items. The words "connect" or "couple" or the like are not limited to physical or mechanical connection, but may include electrical connection, whether direct or indirect. "And/or" mentioned in the examples of the present application represents that there can be three kinds of relationships, for example, A and/or B can represent that there are three kinds of situations: A alone, A and B at the same time, and B alone. The character "/" universally indicates that associated objects are in an "or" relationship.

A voltage gain of the wireless charging system in the related technologies is generally fixed, resulting in poor flexibility of the wireless charging system during charging of the battery. The voltage gain of the wireless charging system refers to: a ratio of an output voltage of the rectifying circuit to a driving voltage applied to the primary resonance circuit.

FIG. 1 is a schematic structural diagram of a wireless charging system provided by an example of the present application. As shown in FIG. 1, the wireless charging system includes electronic device 10 and power transmitting equipment 20. The electronic device 10 includes a wireless charging reception circuit 110 and a battery 120, and the power transmitting equipment 20 includes a primary resonance circuit 210. The primary resonance circuit 210 transmits an electric signal to the wireless charging reception circuit 110 through an electromagnetic induction mode, and the wireless charging reception circuit 110 is connected with the battery 120 and charges the battery 120 based on the received electric signal.

Figure 2:
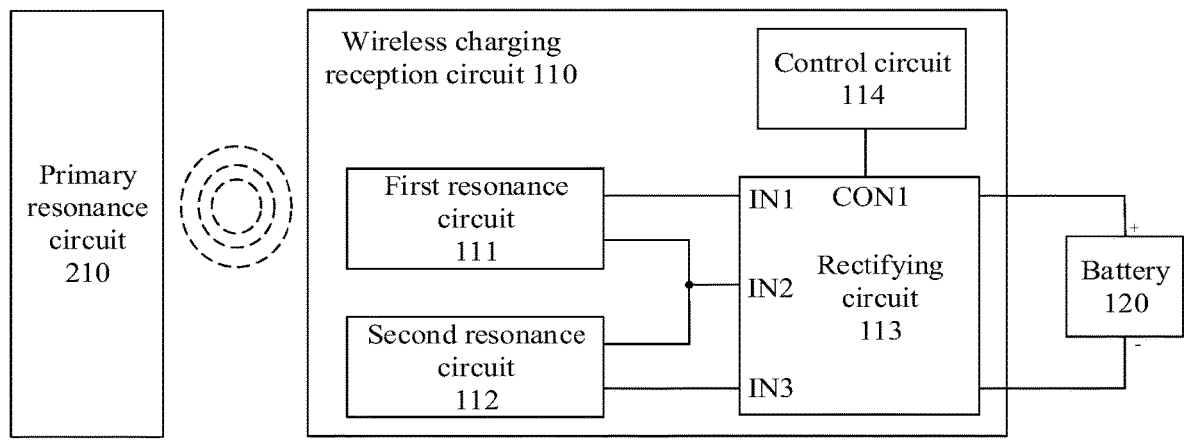
FIG. 2 is a schematic structural diagram of a wireless charging reception circuit provided by an example of the present application.

FIG. 2 is a schematic structural diagram of the wireless charging reception circuit provided by an example of the present application. As shown in FIG. 2, the wireless charging reception circuit 110 includes: a first resonance circuit 111, a second resonance circuit 112, a rectifying circuit 113 and a control circuit 114. The control circuit 114 may be a microcontroller unit (MCU).

The first resonance circuit 111 is connected with the rectifying circuit 113, and the first resonance circuit 111 receives the electric signal transmitted by the primary resonance circuit 210 through an electromagnetic induction mode and outputs the received electric signal to the rectifying circuit 113.

The second resonance circuit 112 is connected with the rectifying circuit 113, and the second resonance circuit 112 receives the electric signal transmitted by the primary resonance circuit 210 through an electromagnetic induction mode and outputs the received electric signal to the rectifying circuit 113.

The rectifying circuit 113 is connected with the control circuit 114 and the battery 120, and the rectifying circuit 113 rectifies the electric signal transmitted by the first resonance circuit 111 and/or the electric signal transmitted by the second resonance circuit 112 based on control of the control circuit 114 and charge the battery 120 based on a rectified electric signal.

In the example of the present application, the rectifying circuit 113 has three input ends, two output ends of the first resonance circuit 111 are connected with a first input end IN1 and a second input end IN2 of the rectifying circuit 113 respectively, and two output ends of the second resonance circuit 112 are connected with the second input end IN2 and a third input end IN3 of the rectifying circuit 113 respectively. The rectifying circuit 113 further has a control end CON1. The control circuit 114 can output a control signal to the control end CON1 of rectifying circuit 113 so as to control the rectifying circuit 113 to rectify the electric signal transmitted by the first resonance circuit 111 and/or the electric signal transmitted by the second resonance circuit 112.

As a possible instance, the control circuit 114 may control the rectifying circuit 113 to rectify electric signals received by the first input end IN1 and the second input end IN2, that is, the control circuit 114 may control the rectifying circuit 113 to rectify the electric signal transmitted by the first resonance circuit 111.

As another possible instance, the control circuit 114 may control the rectifying circuit 113 to rectify electric signals received by the second input end IN2 and the third input end IN3, that is, the control circuit 114 may control the rectifying circuit 113 to rectify the electric signal transmitted by the second resonance circuit 112.

As yet another possible instance, the control circuit 114 may control the rectifying circuit 113 to rectify electric signals received by the first input end IN1 and the third input end IN3, that is, the control circuit 114 may control the rectifying circuit 113 to rectify the electric signal transmitted by the first resonance circuit 111 and the electric signal transmitted by the second resonance circuit 112. Or, the rectifying circuit 113 may rectify an electric signal transmitted by a series resonance circuit constituted by the first resonance circuit 111 and the second resonance circuit 112 in series connection.

Based on the above analysis, it can be known that the rectifying circuit 113 can rectify the electric signal transmitted by the first resonance circuit 111 separately, or rectify the electric signal transmitted by the second resonance circuit 112 separately, or rectify the electric signal transmitted by the series resonance circuit constituted by the first resonance circuit 111 and the second resonance circuit 112 in series connection. Since output voltages of the rectifying circuit 113 are different in the three rectifying modes above, the wireless charging system may have different voltage gains.

In summary, the example of the present application provides a wireless charging reception circuit, and in the wireless charging reception circuit, a control circuit can control the rectifying circuit to rectify the electric signals transmitted by the first resonance circuit and/or the second resonance circuit. Since the rectifying circuit outputs the different voltages after rectifying the electric signals transmitted by the different resonance circuits, the control circuit can be configured to control the rectifying circuit to rectify the electric signals transmitted by the different resonance circuits to adjust the output voltages of the rectifying circuit. The voltage gains of the wireless charging system can be flexibly adjusted, effectively improving flexibility of the wireless charging system during charging of the battery.

Figure 3:
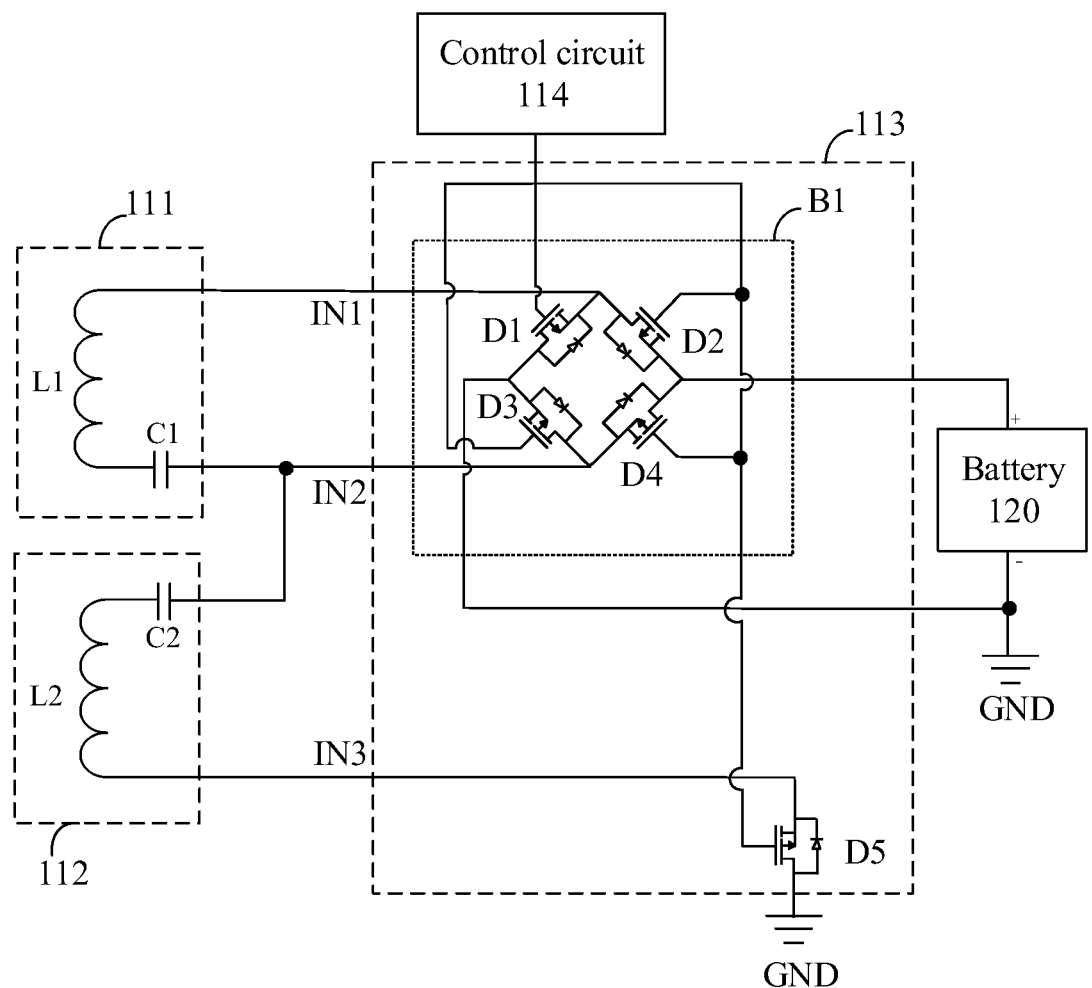
FIG. 3 is a schematic structural diagram of another wireless charging reception circuit provided by an example of the present application.

FIG. 3 is a schematic structural diagram of another wireless charging reception circuit provided by an example of the present application. As shown in FIG. 3, the first resonance circuit 111 may include a first induction coil L1 and a first capacitor C1 connected in series; and the second resonance circuit 112 may include a second induction coil L2 and a second capacitor C2 connected in series. An inductance value of the first induction coil L1 is different from an inductance value of the second induction coil L2.

Understandably, setting the different inductance values of the first induction coil L1 and the second induction coil L2, it can be ensured that the voltage output after the rectifying circuit 113 rectifies the electric signal transmitted by the first resonance circuit 111 separately is different from the voltage output after the rectifying circuit 113 rectifies the electric signal transmitted by the second resonance circuit 112 separately. The control circuit 114 can thereby flexibly adjust the output voltage of the rectifying circuit 113.

For a scenario where the first induction coil L1 and the second induction coil L2 have different inductance values, when power of the electric signal transmitted by the primary resonance circuit 210 to the wireless charging reception circuit 110 is large, the control circuit 114 may control the rectifying circuit 113 to rectify an electric signal transmitted by a first target resonance circuit in the first resonance circuit 111 and the second resonance circuit 112. The first target resonance circuit is the resonance circuit in which the induction coil has the large inductance value. Since the inductance value of the induction coil in the first target resonance circuit is large, it can be ensured that the output voltage of the rectifying circuit 113 is high. In the case where the electric signal provided by the primary resonance circuit 210 is high, by increasing the output voltage of the rectifying circuit 113, currents flowing through the induction coil in the target resonance circuit can be effectively lowered, effectively avoiding the problem of losses caused by over-heating of the induction coil under a large-power scenario.

For the scenario where the first induction coil L1 and the second induction coil L2 have different inductance values, when the currents flowing through the resonance circuit in the wireless charging reception circuit 110 are certain and are large, the control circuit 114 may control the rectifying circuit 113 to rectify an electric signal transmitted by a second target resonance circuit in the first resonance circuit 111 and the second resonance circuit 112. The second target resonance circuit is the resonance circuit in which the induction coil has a small inductance value. Since the inductance value of the induction coil in the second target resonance circuit is small, an impedance of the induction coil is small. On the premise of the certain currents flowing through the resonance circuit, by adopting an induction coil with the small impedance, heating of the induction coil can be effectively lowered, effectively avoiding the problem of losses caused by over-heating.

Referring to FIG. 3, the rectifying circuit 113 may include a first semiconductor device D1, a second semiconductor device D2, a third semiconductor device D3, a fourth semiconductor device D4 and a fifth semiconductor device D5. The first semiconductor device D1 to the fourth semiconductor device D4 constitute a rectifier bridge B1.

Since the rectifying circuit 113 may include the five semiconductor devices, the rectifying circuit 113 may be referred to as a 5-level rectifying circuit.

A first input end of the rectifier bridge B1 serves as the first input end IN1 of the rectifying circuit 113 and is connected with a first output end of the first resonance circuit 111, a second input end of the rectifier bridge B1 serves as the second input end IN2 of the rectifying circuit 113 and is connected with a second output end of the first resonance circuit 111 and the first output end of the second resonance circuit 112, and a first pole of the fifth semiconductor device D5 serves as the third input end IN3 of the rectifying circuit and is connected with the second output end of the second resonance circuit 112.

A first output end of the rectifier bridge B1 is connected with a positive electrode of the battery 120, and a second output end of the rectifier bridge B1 and a second pole of the fifth semiconductor device D5 are both connected with a negative electrode of the battery 120.

A first pole of the first semiconductor device D1 and a second pole of the second semiconductor device D2 serve as the first input end IN1 of the rectifier bridge B1 and are connected with the first output end of the first resonance circuit 111; a second pole of the first semiconductor device D1 and a second pole of the third semiconductor device D3 serve as the second output end of the rectifier bridge B1 and are connected with the negative electrode of the battery 120; and the negative electrode of the battery 120 and a second pole of the fifth semiconductor device D5 are both connected with a ground GND.

A first pole of the third semiconductor device D3 and a second pole of the fourth semiconductor device D4 serve as the second input end IN2 of the rectifier bridge B1 and are connected with the second output end of the first resonance circuit 111 and the first output end of the first resonance circuit 111 respectively; and a first pole of the second semiconductor device D2 and a first pole of the fourth semiconductor device D4 serve as the first output end of the rectifier bridge B1 to be connected with the positive electrode of the battery 120.

A control pole of the fifth semiconductor device D5 and a control pole of at least one semiconductor device in the rectifier bridge B1 are connected with the control circuit 114, and the control circuit 114 controls a working state of the connected semiconductor device to make the rectifying circuit 113 rectify the electric signals transmitted by the different resonance circuits.

In the example of the present application, the semiconductor device connected with the control circuit 114 may be a metal-oxide semiconductor field effect transistor (MOSFET), such as a field effect transistor with a parasitic diode. A control pole of the field effect transistor is a gate electrode. The semiconductor device, not connected with the control circuit 114, in the rectifier bridge B1 may be a diode.

The control circuit 114 may output a control signal to the control pole of the field effect transistor, and may adjust a voltage of the control signal applied to the control pole of the field effect transistor to make the field effect transistor be in one of the following states: turning off, turning on, or working according to a diode mode. The control circuit 114 controlling the field effect transistor to work according to the diode mode means that: the on-off state of the field effect transistor is determined by a voltage applied to a first pole of the field effect transistor and a voltage applied to a second pole. Or, the field effect transistor may be equivalent to a diode, the first pole of the field effect transistor may be equivalent to a negative pole of the diode, and the second pole of the field effect transistor may be equivalent to a positive pole of the diode.

Optionally, the control circuit 114 controls the working state of the connected semiconductor device to make the rectifying circuit 113 be in any one of the following working modes:

In working mode I: the fifth semiconductor device D5 is turned off, and each semiconductor device in the rectifier bridge B1 works according to the diode mode.

Figure 4:
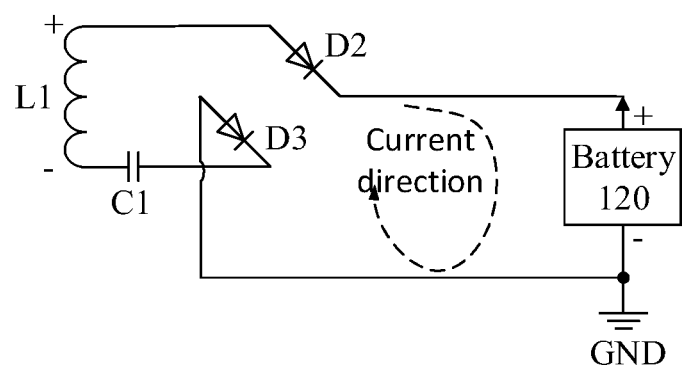
FIG. 4 is an equivalent circuit diagram of a rectifying circuit in a working mode I provided by an example of the present application.
Figure 5:
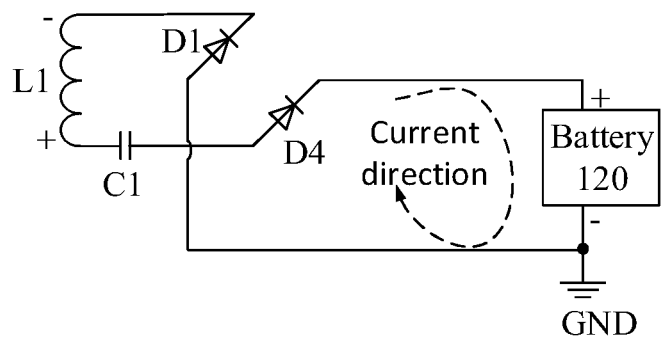
FIG. 5 is an equivalent circuit diagram of another rectifying circuit in a working mode I provided by an example of the present application.

FIG. 4 is an equivalent circuit diagram of the rectifying circuit in working mode I provided by an example of the present application. FIG. 5 is an equivalent circuit diagram of another rectifying circuit in working mode I provided by an example of the present application. As shown in FIG. 4 and FIG. 5, in working mode I, since the fifth semiconductor device D5 is turned off, the second resonance circuit 112 cannot be connected into the rectifying circuit 113, so that the rectifying circuit 113 rectifies the electric signal transmitted by the first resonance circuit 111 separately.

Referring to FIG. 4, when the electric signal transmitted by the first resonance circuit 111 is at a positive half cycle, the first semiconductor device D1 and the fourth semiconductor device D4 are turned off, and the second semiconductor device D2 and the third semiconductor device D3 are turned on. A first induction coil L1, the second semiconductor device D2, the battery 120, the third semiconductor device D3 and the first capacitor C1 constitute a current loop. The second semiconductor device D2 and the third semiconductor device D3 may rectify currents in the current loop and charge the battery 120.

Referring to FIG. 5, when the electric signal transmitted by the first resonance circuit 111 is at a negative half cycle, the first semiconductor device D1 and the fourth semiconductor device D4 are turned on, and the second semiconductor device D2 and the third semiconductor device D3 are turned off. The first induction coil L1, the first capacitor C1, the fourth semiconductor device D4, the battery 120 and the first semiconductor device D1 constitute a current loop. The first semiconductor device D1 and the fourth semiconductor device D4 may rectify currents in the current loop and charge the battery 120.

Working mode II: the second semiconductor device D2 and the fifth semiconductor device D5 are turned off, the first semiconductor device D1 is turned on, and the third semiconductor device D3 and the fourth semiconductor device D4 work according to the diode mode.

Figure 6:
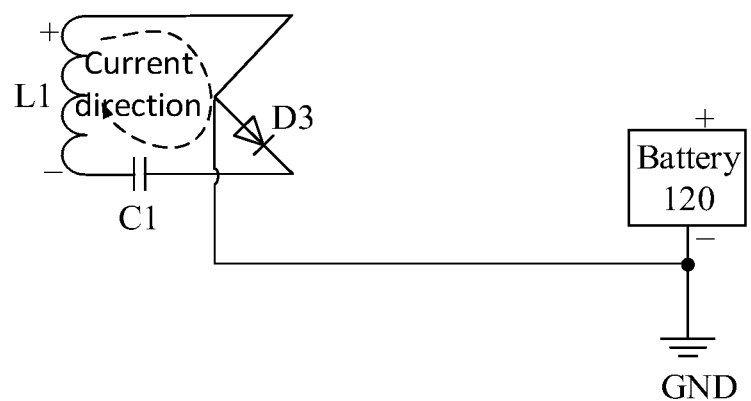
FIG. 6 is an equivalent circuit diagram of a rectifying circuit in a working mode II provided by an example of the present application.
Figure 7:
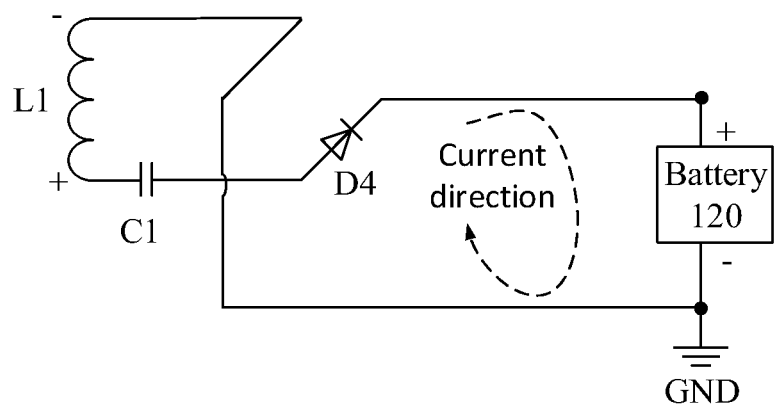
FIG. 7 is an equivalent circuit diagram of another rectifying circuit in a working mode II provided by an example of the present application.

FIG. 6 is an equivalent circuit diagram of the rectifying circuit in working mode II provided by an example of the present application. FIG. 7 is an equivalent circuit diagram of another rectifying circuit in working mode II provided by an example of the present application. As shown in FIG. 6 and FIG. 7, in working mode II, since the fifth semiconductor device D5 is turned off, the second resonance circuit 112 cannot be connected into the rectifying circuit 113, so that the rectifying circuit 113 rectifies the electric signal transmitted by the first resonance circuit 111 separately. Referring to FIG. 6, when the electric signal transmitted by the first resonance circuit 111 is at the positive half cycle, the fourth semiconductor device D4 is turned off, and the third semiconductor device D3 is turned on. The first induction coil L1, the first capacitor C1 and the third semiconductor device D3 constitute a current loop. The third semiconductor device D3 may rectify currents in the current loop and charge the first capacitor C1, that is, the first capacitor C1 may store electrical charge.

Referring to FIG. 7, when the electric signal transmitted by the first resonance circuit 111 is at the negative half cycle, the fourth semiconductor device D4 is turned on, and the third semiconductor device D3 is turned off. The first induction coil L1, the first capacitor C1, the fourth semiconductor device D4 and the battery 120 constitute a current loop. The fourth semiconductor device D4 may rectify currents in the current loop and charge the battery 120.

Optionally, in working mode II, voltages applied by the control circuit 114 to a control pole of the second semiconductor device D2, the control pole of the fifth semiconductor device D5 and a control pole of a sixth semiconductor device D6 may be a first threshold voltage to make the second semiconductor device D2, the fifth semiconductor device D5 and the sixth semiconductor device D6 be in a turned-off state. A voltage applied by the control circuit 114 to a control pole of the first semiconductor device D1 may be a second threshold voltage to make the first semiconductor device D1 be in a turned-on state. Voltages applied by the control circuit 114 to control poles of the third semiconductor device D3 and the fourth semiconductor device D4 may be a third threshold voltage to make the third semiconductor device D3 and the fourth semiconductor device D4 work according to the diode mode. The third threshold voltage is between the first threshold voltage and the second threshold voltage.

Or, the control circuit 114 may store cycle information of the electric signal transmitted by the first resonance circuit 111. When the electric signal transmitted by the first resonance circuit 111 is at the positive half cycle, the voltage applied by the control circuit 114 to the control pole of the third semiconductor device D3 is the second threshold voltage, and the voltage applied by the control circuit 114 to the control pole of the fourth semiconductor device D4 is the first threshold voltage. When the electric signal transmitted by the first resonance circuit 111 is at the negative half cycle, the voltage applied by the control circuit 114 to the control pole of the third semiconductor device D3 is the first threshold voltage, and the voltage applied by the control circuit 114 to the control pole of the fourth semiconductor device D4 is the second threshold voltage.

Understandably, when the electric signal transmitted by the first resonance circuit 111 is at the negative half cycle, the rectifying circuit 113 can not only rectify the electric signal received by the first resonance circuit 111 through the electromagnetic induction mode, but also rectify an electric signal released by the first storage capacitor C1, so that the output voltage of the rectifying circuit 113 is large.

In working mode III, the first semiconductor device D1 and the second semiconductor device D2 are turned off, the fifth semiconductor device D5 is turned on, and the third semiconductor device D3 and the fourth semiconductor device D4 work according to the diode mode.

Figure 8:
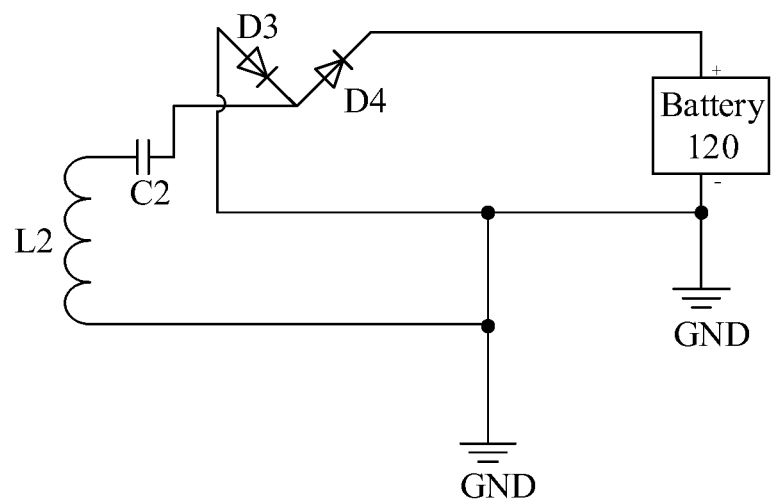
FIG. 8 is an equivalent circuit diagram of a rectifying circuit in a working mode III provided by an example of the present application.

FIG. 8 is an equivalent circuit diagram of the rectifying circuit in working mode III provided by an example of the present application. As shown in FIG. 8, in working mode III, since the first semiconductor device D1 and the second semiconductor device D2 are turned off, the first resonance circuit 111 cannot be connected into the rectifying circuit 113, so that the rectifying circuit 113 rectifies the electric signal transmitted by the second resonance circuit 112 separately. Referring to FIG. 8, when the electric signal transmitted by the second resonance circuit 112 is at the negative half cycle, the third semiconductor device D4 is turned on, and the fourth semiconductor device D4 is turned off. A second induction coil L2, the second capacitor C2 and the third semiconductor device D3 constitute a current loop. The third semiconductor device D3 may rectify currents in the current loop and charge the second capacitor C2, that is, the second capacitor C2 may store electric energy.

Referring to FIG. 8, when the electric signal transmitted by the second resonance circuit 112 is at the positive half cycle, the third semiconductor device D3 is turned off, and the fourth semiconductor device D4 is turned on. The second induction coil L2, the second capacitor C2 and the fourth semiconductor device D4 constitute a loop. The fourth semiconductor device D4 may rectify currents in the current loop and charge the battery 120.

Understandably, when the electric signal transmitted by the second resonance circuit 112 is at the positive half cycle, the rectifying circuit 113 cannot only rectify the electric signal received by the second resonance circuit 112 through the electromagnetic induction mode, but also rectify an electric signal released by the second capacitor C2, so that the output voltage of the rectifying circuit 113 is large.

Figure 9:
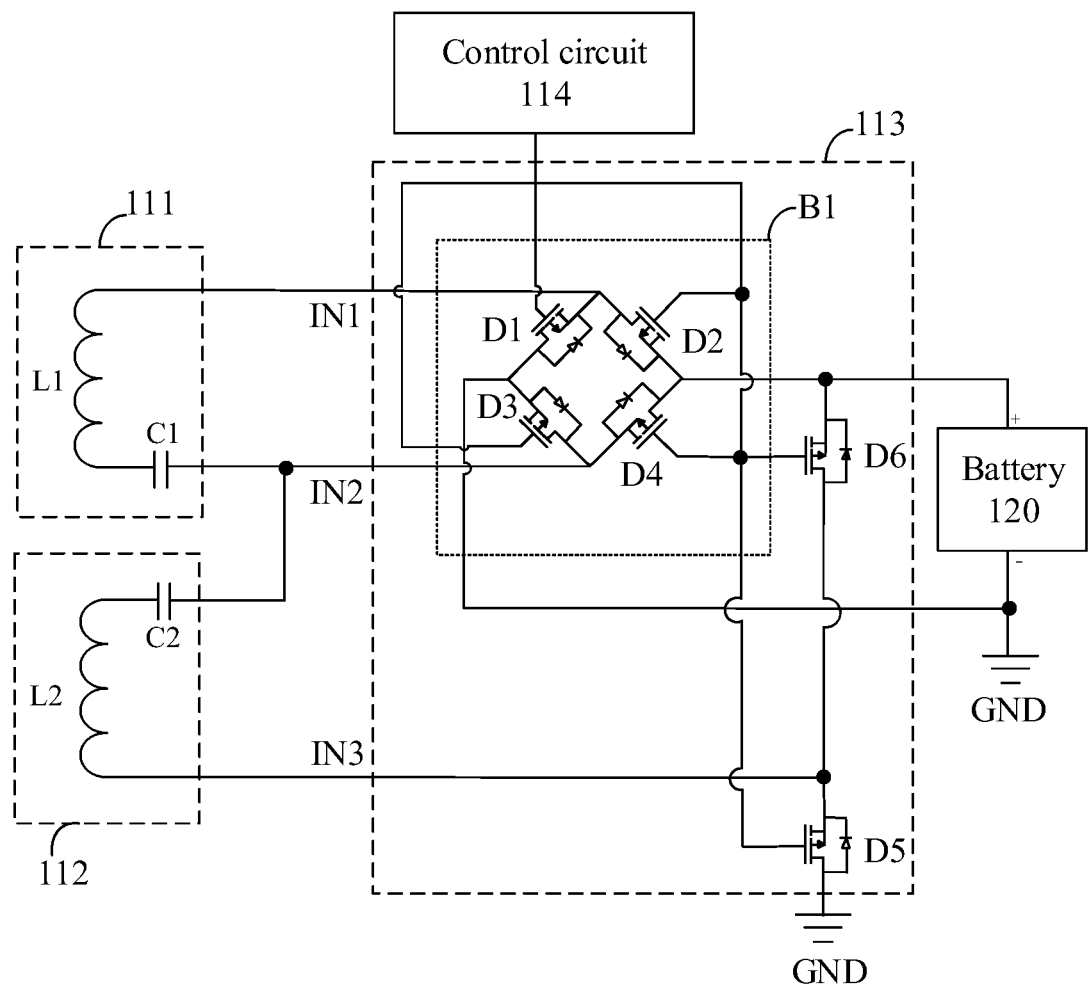
FIG. 9 is a schematic structural diagram of yet another wireless charging reception circuit provided by an example of the present application.

FIG. 9 is a schematic structural diagram of yet another wireless charging reception circuit provided by an example of the present application. As shown in FIG. 9, the rectifying circuit 113 may further include a sixth semiconductor device D6. A first pole of the sixth semiconductor device D6 is connected with the positive electrode of the battery 120, a second pole of the sixth semiconductor device D6 is connected with an output end of the first resonance circuit 111, and a control pole of the sixth semiconductor device D6 is connected with the control circuit 114.

Since the rectifying circuit 113 may include the six semiconductor devices, the rectifying circuit 113 may be referred to as a 6-level rectifying circuit.

The control circuit 114 controls the rectifying circuit 113 to be in any one of the following working modes:

Working mode IV: the first semiconductor device D1 and the second semiconductor device D2 are turned off, and any one of the third semiconductor device D3, the fourth semiconductor device D4, the fifth semiconductor device D5, the sixth semiconductor device D6 works according to the diode mode.

Figure 10:
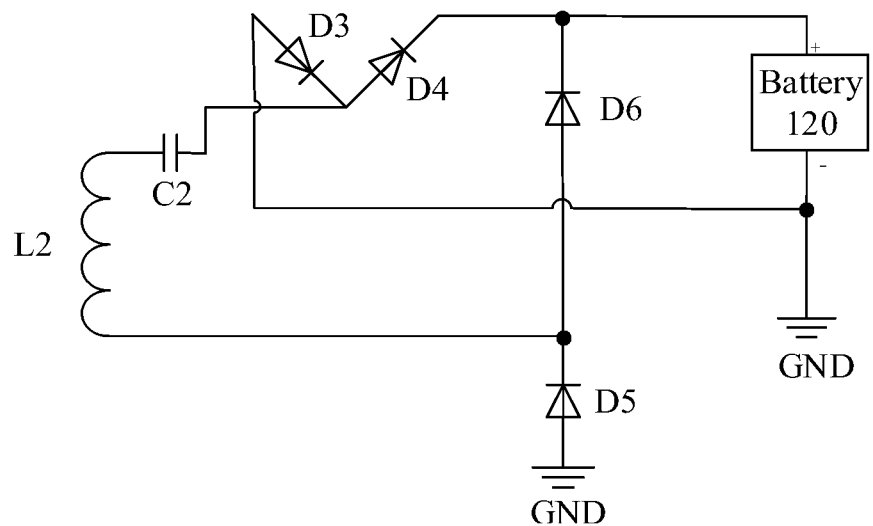
FIG. 10 is an equivalent circuit diagram of a rectifying circuit in a working mode IV provided by an example of the present application.

FIG. 10 is an equivalent circuit diagram of the rectifying circuit in working mode IV provided by an example of the present application. As shown in FIG. 10, in working mode IV, since the first semiconductor device D1 and the second semiconductor device D2 are turned off, the first resonance circuit 111 cannot be connected into the rectifying circuit 113, so that the rectifying circuit 113 rectifies the electric signal transmitted by the second resonance circuit 112 separately. When the electric signal transmitted by the second resonance circuit 112 is at the positive half cycle, the fourth semiconductor device D4 and the fifth semiconductor device D5 are turned on, and the third semiconductor device D3 and the sixth semiconductor device D6 are turned off. The second induction coil L2, the second capacitor C2, the fourth semiconductor device D4 and the fifth semiconductor device D5 constitute a current loop in a full-bridge mode. The fourth semiconductor device D4 and the fifth semiconductor device D5 may rectify currents in the current loop and charge the battery 120.

When the electric signal transmitted by the second resonance circuit 112 is at the negative half cycle, the fourth semiconductor device D4 and the fifth semiconductor device D5 are turned off, and the third semiconductor device D3 and the sixth semiconductor device D6 are turned off. The second induction coil L2, the second capacitor C2, the fourth semiconductor device D4 and the fifth semiconductor device D5 constitute a current loop in a full-bridge mode. The third semiconductor device D3 and the sixth semiconductor device D6 may rectify currents in the current loop and charge the battery 120.

In Working mode V, the third semiconductor device D3 and the fourth semiconductor device D4 are turned off, and any one of the first semiconductor device D1, the second semiconductor device D2, the fifth semiconductor device D5 and the sixth semiconductor device D6 works according to the diode mode.

Figure 11:
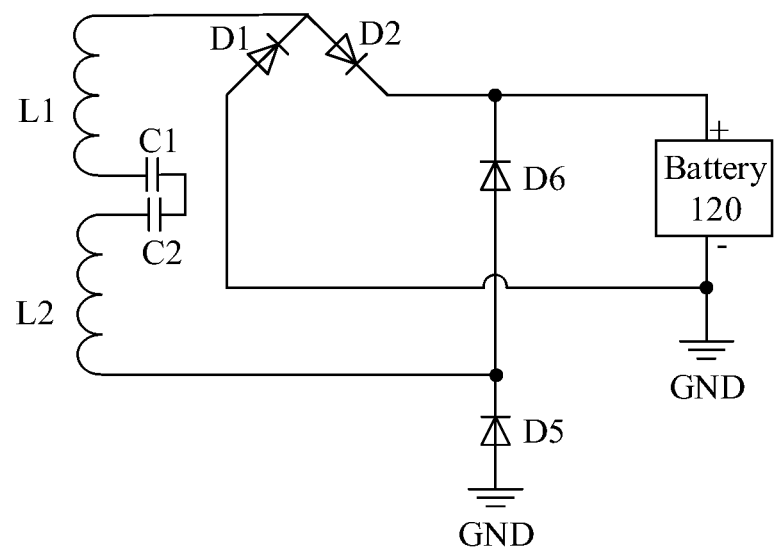
FIG. 11 is an equivalent circuit diagram of a rectifying circuit in a working mode V provided by an example of the present application.

FIG. 11 is an equivalent circuit diagram of the rectifying circuit in working mode V provided by an example of the present application. As shown in FIG. 11, in working mode V, since the fifth semiconductor device D5 is turned on and any one of the first semiconductor device D1 and the second semiconductor device D2 is turned on, the rectifying circuit 113 rectifies the electric signal transmitted by the series resonance circuit constituted by the first resonance circuit 111 and the second resonance circuit 112 in series connection.

When the electric signal transmitted by the series resonance circuit constituted by the first resonance circuit 111 and the second resonance circuit 112 is at the positive half cycle, the second semiconductor device D4 and the fifth semiconductor device D5 are turned on, and the first semiconductor device D1 and the sixth semiconductor device D6 are turned off. The first induction coil L1, the first capacitor C1, the second induction coil L2, the second capacitor C2, the second semiconductor device D2 and the fifth semiconductor device D5 constitute a current loop in a full-bridge mode. The second semiconductor device D2 and the fifth semiconductor device D5 may rectify currents in the current loop and charge the battery 120.

When the electric signal transmitted by the series resonance circuit constituted by the first resonance circuit 111 and the second resonance circuit 112 is at the negative half cycle, the second semiconductor device D4 and the fifth semiconductor device D5 are turned off, and the first semiconductor device D1 and the sixth semiconductor device D6 are turned on. The first induction coil L1, the first capacitor C1, the second induction coil L2, the second capacitor C2, the first semiconductor device D1 and the sixth semiconductor device D6 constitute a current loop in a full-bridge mode. The first semiconductor device D1 and the sixth semiconductor device D6 may rectify currents in the current loop and charge the battery 120.

As a possible instance, the first induction coil L1 and the second induction coil L2 are the same in winding direction. After the first resonance circuit 111 and the second resonance circuit 112 are connected in series, the electric signals induced by the two resonance circuits may be accumulated, that is, the electric signals induced by the two resonance circuits may increase. Correspondingly, a voltage value of an electric signal obtained after the rectifying circuit 113 rectifies the electric signal transmitted by the series resonance circuit is large, so that the voltage gain of the wireless charging system may be large.

As another possible instance, the first induction coil L1 and the second induction coil L2 are different in winding direction. After the first resonance circuit 111 and the second resonance circuit 112 are connected in series, the electric signals induced by the two resonance circuits may be offset. Correspondingly, a voltage value of an electric signal obtained after the rectifying circuit 113 rectifies the electric signal transmitted by the series resonance circuit is small, so that the voltage gain of the wireless charging system may be small.

Understandably, for the wireless charging reception circuit shown in FIG. 9, the control circuit 114 may further control the sixth semiconductor device D6 to be turned off to make the rectifying circuit 113 be in any one of working mode I to working mode III.

Understandably, in the example of the present application, the control circuit 114 may control the rectifying circuit 113 to be switched among the plurality of working modes to flexibly adjust the output voltage of the rectifying circuit 113.

Taking the wireless charging reception circuit 110 shown in FIG. 9 as an example, if the control circuit 114 may control the rectifying circuit 113 to be switched between working mode I and working mode II, the first semiconductor device D1, the second semiconductor device D2, the fifth semiconductor device D5 and the sixth semiconductor device D6 in the rectifying circuit 113 are all field effect transistors, and the third semiconductor device D3 and the fourth semiconductor device D4 are both diodes. If the control circuit 114 may control the rectifying circuit 113 to be switched between working mode I and working mode V, the third semiconductor device D3, the fourth semiconductor device D4, the fifth semiconductor device D5 and the sixth semiconductor device D6 in the rectifying circuit 113 are all field effect transistors, and the first semiconductor device D1 and the second semiconductor device D2 are both diodes.

Optionally, in the example of the present application, the control circuit 114 may be further connected with the output end of the rectifying circuit 113 and may detect the output voltage of the rectifying circuit 113 for multi-level rectifying. The control circuit 114 may then adjust the working mode of the rectifying circuit 113 according to the volume of the output voltage of the rectifying circuit 113.

A process of adjusting the working mode of the rectifying circuit 113 by the control circuit 114 is explained below by taking an example that the inductance value of the second induction coil L2 is greater than the inductance value of the first induction coil L1.

As a possible implementation, when the wireless charging system starts to work, the control circuit 114 may control the rectifying circuit 113 to operate in working mode V. Since in working mode V, the rectifying circuit 113 can rectify the electric signal transmitted by the series resonance circuit constituted by the first resonance circuit 111 and the second resonance circuit 112 in series connection, the output voltage of the rectifying circuit 113 is large. Correspondingly, the voltage gain of the wireless charging system is large.

When the wireless charging system starts to work, the output voltage of the primary resonance circuit 210 is small, or a distance between the wireless charging reception circuit 110 and the primary resonance circuit 210 may be far, that is, the coupling effect between the wireless charging reception circuit 110 and the primary resonance circuit 210 is poor, and the voltage gain of the wireless charging system may be controlled to be large to ensure the charging effect of the battery.

When the control circuit 114 detects that the output voltage of the rectifying circuit 113 is greater than a target voltage, the control circuit 114 may control the rectifying circuit 113 to be switched to working mode I, working mode II, working mode III or working mode IV. Since in working mode I to working mode IV, the rectifying circuit 113 rectifies the electric signal transmitted by one resonance circuit separately, the output voltage of the rectifying circuit 113 is small. Correspondingly, the voltage gain of the wireless charging system is small.

When the output voltage of the rectifying circuit 113 is greater than the target voltage, the control circuit 114 may determine that the output voltage of the primary resonance circuit 210 is large, or the distance between the wireless charging reception circuit 110 and the primary resonance circuit 210 may be near, that is, the coupling effect between the wireless charging reception circuit 110 and the primary resonance circuit 210 is good, and the voltage gain of the wireless charging system may be adjusted to be small. Normal work of a circuit of the later level may be prevented from being affected by burning of a chip connected with the rectifying circuit 113 caused by an overly high output voltage of the rectifying circuit 113.

As another possible implementation, when the wireless charging system starts to work, the control circuit 114 may control the rectifying circuit 113 to operate in working mode II or working mode III to make the voltage gain of the wireless charging system large. When the control circuit 114 detects that the output voltage of the rectifying circuit 113 is greater than the target voltage, the rectifying circuit 113 may be controlled to be switched to working mode I or working mode IV to adjust the voltage gain of the wireless charging system to be small.

In summary, the example of the present application provides a wireless charging reception circuit, and in the wireless charging reception circuit, the control circuit can control the rectifying circuit to rectify the electric signals transmitted by the first resonance circuit or the series resonance circuit. Since the rectifying circuit outputs the different voltages after rectifying the electric signals transmitted by the different resonance circuits, the control circuit can be configured to control the rectifying circuit to rectify the electric signals transmitted by the different resonance circuits to adjust the output voltages of the rectifying circuit. In addition, multi-level rectifying may be further performed. The voltage gains of the wireless charging system can be flexibly adjusted, effectively improving flexibility of the wireless charging system during charging of the battery.

Figure 12:
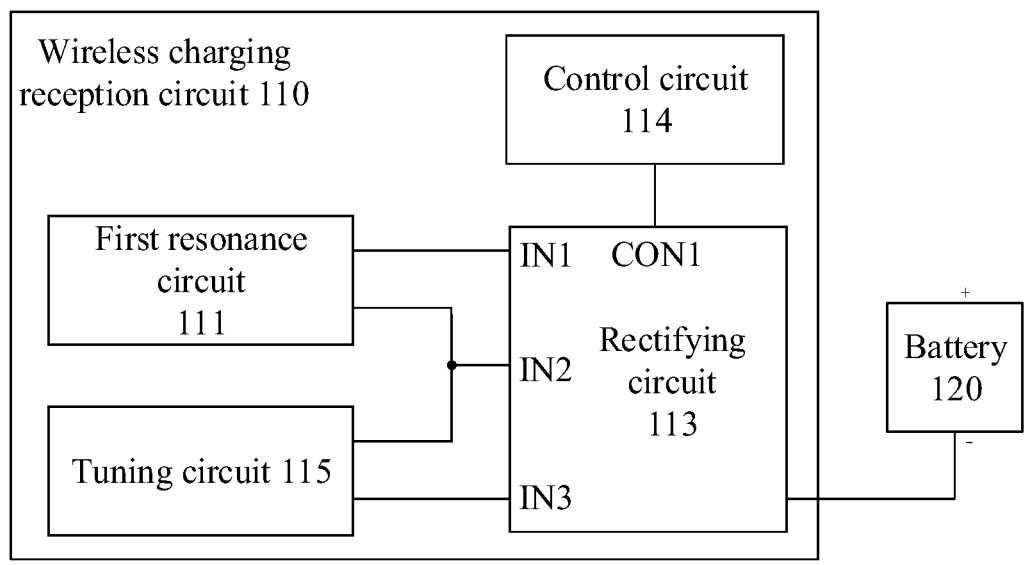
FIG. 12 is a schematic structural diagram of further another wireless charging reception circuit provided by an example of the present application.

An example of the present application provides another wireless charging reception circuit. As shown in FIG. 12, the wireless charging reception circuit 110 includes: a first resonance circuit 111, a tuning circuit 115, a rectifying circuit 113 and a control circuit 114.

The first resonance circuit 111 is connected with the rectifying circuit 113, and the first resonance circuit 111 receives an electric signal transmitted by a primary resonance circuit 210 through an electromagnetic induction mode and outputs the received electric signal to the rectifying circuit 113.

The tuning circuit 115 is in circuit connection with the first resonance circuit 111 and the rectifying circuit 113, and the tuning circuit 115 is connected with the first resonance circuit 111 in series to form a series resonance circuit.

The rectifying circuit 113 is further connected with the control circuit 114 and a battery 120, and the rectifying circuit 113 rectifies an electric signal transmitted by the first resonance circuit 111 or an electric signal transmitted by the series resonance circuit based on control of the control circuit 114 and charge the battery 120 based on a rectified electric signal.

In the example of the present application, the rectifying circuit 113 has three input ends, and two input ends of the first resonance circuit 111 are connected with a first input end IN1 and a second input end IN2 of the rectifying circuit 113 respectively. Two input ends of the series resonance circuit are connected with the first input end IN1 and a third input end IN3 of the rectifying circuit 113 respectively. The rectifying circuit 113 further has a control end CON1. The control circuit 114 can output a control signal to the control end CON1 of the rectifying circuit 113 so as to control the rectifying circuit 113 to rectify the electric signal transmitted by the first resonance circuit 111 or the electric signal transmitted by the series resonance circuit.

As a possible instance, the control circuit 114 may control the rectifying circuit 113 to rectify electric signals received by the first input end IN1 and the second input end IN2, that is, the control circuit 114 may control the rectifying circuit 113 to rectify the electric signal transmitted by the first resonance circuit 111.

As another possible instance, the control circuit 114 may control the rectifying circuit 113 to rectify electric signals received by the first input end IN1 and the third input end IN3, that is, the control circuit 114 may control the rectifying circuit 113 to rectify the electric signal transmitted by the series resonance circuit constituted by the first resonance circuit 111 and the tuning circuit 115 in series connection.

Based on the above analysis, it can be known that the rectifying circuit 113 can rectify the electric signal transmitted by the first resonance circuit 111 separately, or rectify the electric signal transmitted by the series resonance circuit constituted by the first resonance circuit 111 and the tuning circuit 115 in series connection. Since output voltages of the rectifying circuit 113 are different in the two modes above, the wireless charging system may have different voltage gains.

In summary, the example of the present application provides a wireless charging reception circuit, and in the wireless charging reception circuit, the control circuit can control the rectifying circuit to rectify the electric signals transmitted by the first resonance circuit or the series resonance circuit. Since the rectifying circuit outputs the different voltages after rectifying the electric signals transmitted by the different resonance circuits, the control circuit can be configured to control the rectifying circuit to rectify the electric signals transmitted by the different resonance circuits to adjust the output voltages of the rectifying circuit. The voltage gains of the wireless charging system can be flexibly adjusted, effectively improving flexibility of the wireless charging system during charging of the battery.

Figure 13:
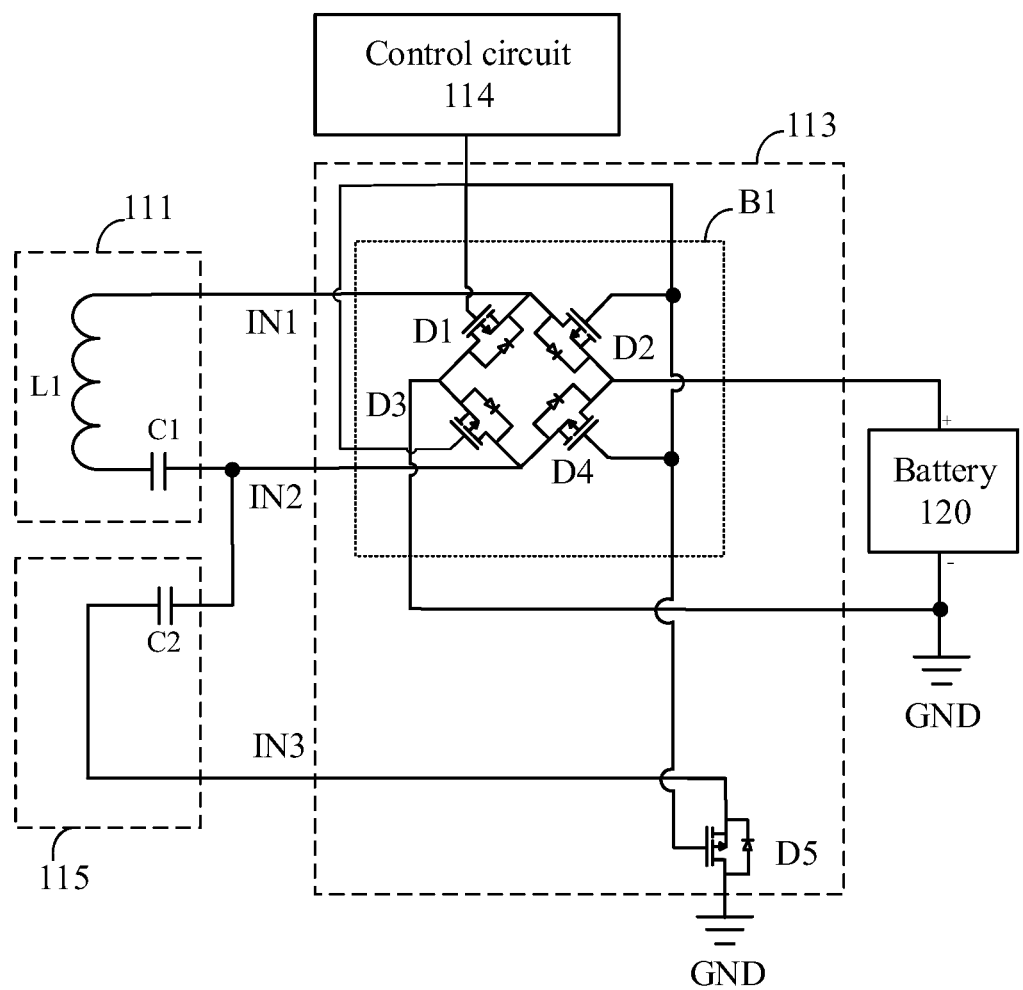
FIG. 13 is a schematic structural diagram of further another wireless charging reception circuit provided by an example of the present application.

FIG. 13 is a schematic structural diagram of further another wireless charging reception circuit provided by an example of the present application. As shown in FIG. 13, the first resonance circuit 111 may include a first induction coil L1 and a first capacitor C1 connected in series; and the tuning circuit 115 includes a second induction coil L2 or a second capacitor C2. In FIG. 13, illustration is made by taking an example that the tuning circuit 115 includes the second capacitor C2.

Understandably, a resonance frequency of the resonance circuit is related to an inductance value of an induction coil in the resonance circuit and a capacitance value of the capacitor, so that a resonance frequency of the series resonance circuit is different from a resonance frequency of the first resonance circuit 111. Then, a coupling coefficient between the series resonance circuit and the primary resonance circuit 210 is different from a coupling coefficient between the first resonance circuit 111 and the primary resonance circuit 210. A voltage output after the rectifying circuit 113 rectifies the electric signal transmitted by the first resonance circuit 111 separately is different from a voltage output after the rectifying circuit 113 rectifies the electric signal transmitted by the series resonance circuit. In other words, by adding the tuning circuit 115, resonance frequency points of the resonance circuits in the wireless charging reception circuit may be differentiated, so that the wireless charging system generates different voltage gains.

Referring to FIG. 13, the rectifying circuit 113 may include a first semiconductor device D1, a second semiconductor device D2, a third semiconductor device D3, a fourth semiconductor device D4 and a fifth semiconductor device D5. The first semiconductor device D1 to the fourth semiconductor device D4 constitute a rectifier bridge B1.

Since the rectifying circuit 113 may include the five semiconductor devices, the rectifying circuit 113 may be referred to as a 5-level rectifying circuit.

A first input end of the rectifier bridge B1 serves as the first input end IN1 of the rectifying circuit 113 and is connected with a first output end of the first resonance circuit 111, a second input end of the rectifier bridge B1 serves as the second input end IN2 of the rectifying circuit 113 and is connected with a second output end of the first resonance circuit 111 and a first output end of the tuning circuit 115, and a first pole of the fifth semiconductor device D5 is connected with a second output end of the tuning circuit 115.

A first output end of the rectifier bridge B1 is connected with a positive electrode of the battery 120, and a second output end of the rectifier bridge B1 and a second pole of the fifth semiconductor device D5 are both connected with a negative electrode of the battery 120.

A control pole of the fifth semiconductor device D5 and a control pole of at least one semiconductor device in the rectifier bridge B1 are connected with the control circuit 114, and the control circuit 114 may be configured to output a control signal to the connected semiconductor device to control a working state of the connected semiconductor device.

Optionally, the control circuit 114 controls the working state of the connected semiconductor device to make the rectifying circuit 113 be in following working modes:

In working mode I: the fifth semiconductor device D5 is turned off, and each semiconductor device in the rectifier bridge B1 works according to a diode mode;

In working mode II: the second semiconductor device D2 and the fifth semiconductor device D5 are turned off, the first semiconductor device D1 is turned on, and the third semiconductor device D3 and the fourth semiconductor device D4 work according to the diode mode; and In working mode VI: the third semiconductor device D3 and the fourth semiconductor device D4 are turned off, the fifth semiconductor device D5 is turned on, and the first semiconductor device D1 and the second semiconductor device D2 work according to the diode mode.

The working principle of the rectifying circuit 113 in working mode I or working mode II may refer to relevant descriptions in the above examples, which is not repeated here.

Figure 14:
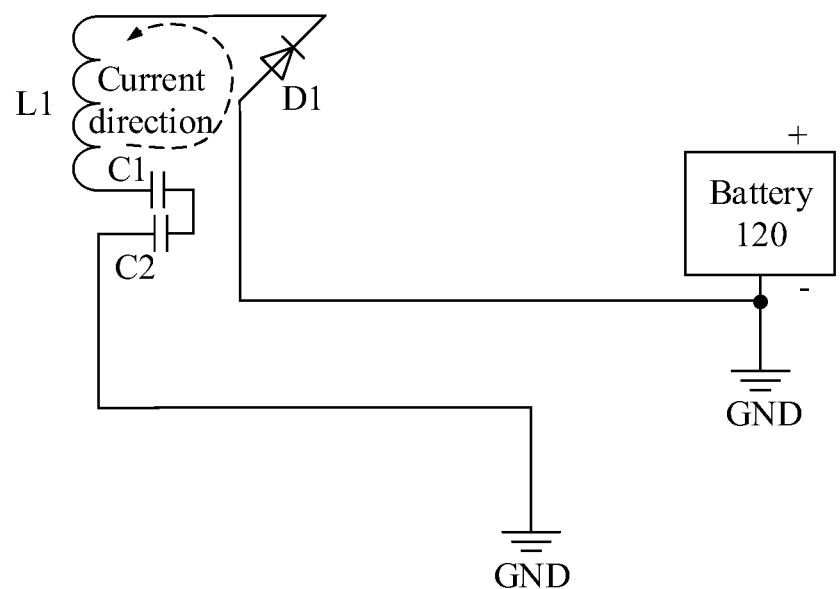
FIG. 14 is an equivalent circuit diagram of a rectifying circuit in a working mode VI provided by an example of the present application.
Figure 15:
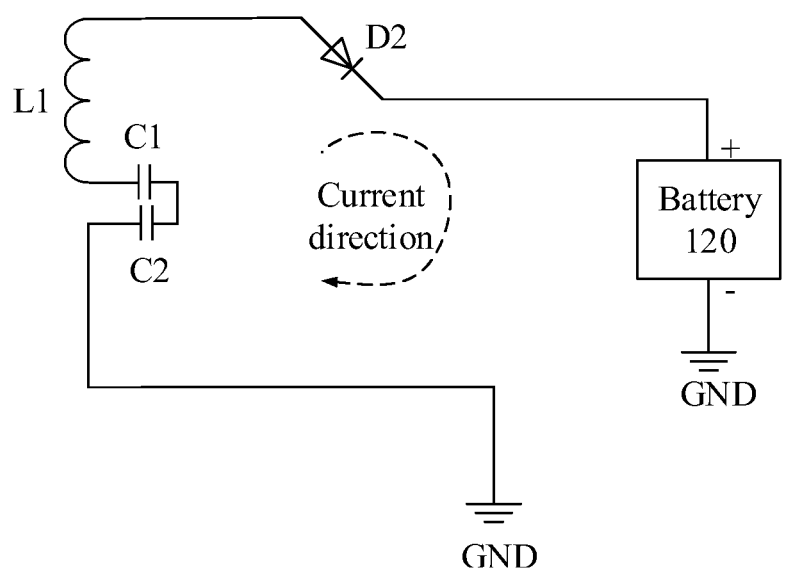
FIG. 15 is an equivalent circuit diagram of another rectifying circuit in a working mode VI provided by an example of the present application.

FIG. 14 is an equivalent circuit diagram of one rectifying circuit in working mode VI provided by an example of the present application. FIG. 15 is an equivalent circuit diagram of another rectifying circuit in working mode VI provided by an example of the present application. As shown in FIG. 14 and FIG. 15, in working mode VI, since the fifth semiconductor device D5 is turned on and any one of the first semiconductor device D1 and the second semiconductor device D2 is turned on, the rectifying circuit 113 rectifies the electric signal transmitted by the series resonance circuit constituted by the first resonance circuit 111 and the tuning circuit 115 in series connection.

When the electric signal transmitted by the series resonance circuit constituted by the first resonance circuit 111 and the tuning circuit 115 is at a negative half cycle, the first semiconductor device D1 is turned on, and the second semiconductor device D2 is turned off. The first semiconductor device D1, the first capacitor C1 and the second capacitor C2 constitute a current loop. The first semiconductor device D1 may rectify currents in the current loop and charge the first capacitor C1 and the second capacitor C2.

When the electric signal transmitted by the series resonance circuit constituted by the first resonance circuit 111 and the tuning circuit 115 is at a positive half cycle, the first semiconductor device D1 is turned off, and the second semiconductor device D2 is turned on. A first induction coil L1, the first capacitor C1, the second capacitor C2 and the second semiconductor device D2 constitute a current loop. The second semiconductor device D2 may rectify currents in the current loop and charge the battery 120.

Understandably, when the electric signal transmitted by the series resonance circuit constituted by the first resonance circuit 111 and the tuning circuit 115 is at the positive half cycle, the rectifying circuit 113 can not only rectify the electric signal received by the second resonance circuit 112 through the electromagnetic induction mode, but also rectify an electric signal released by the first capacitor C1 and the second capacitor C2, so that the output voltage of the rectifying circuit 113 is large.

Figure 16:
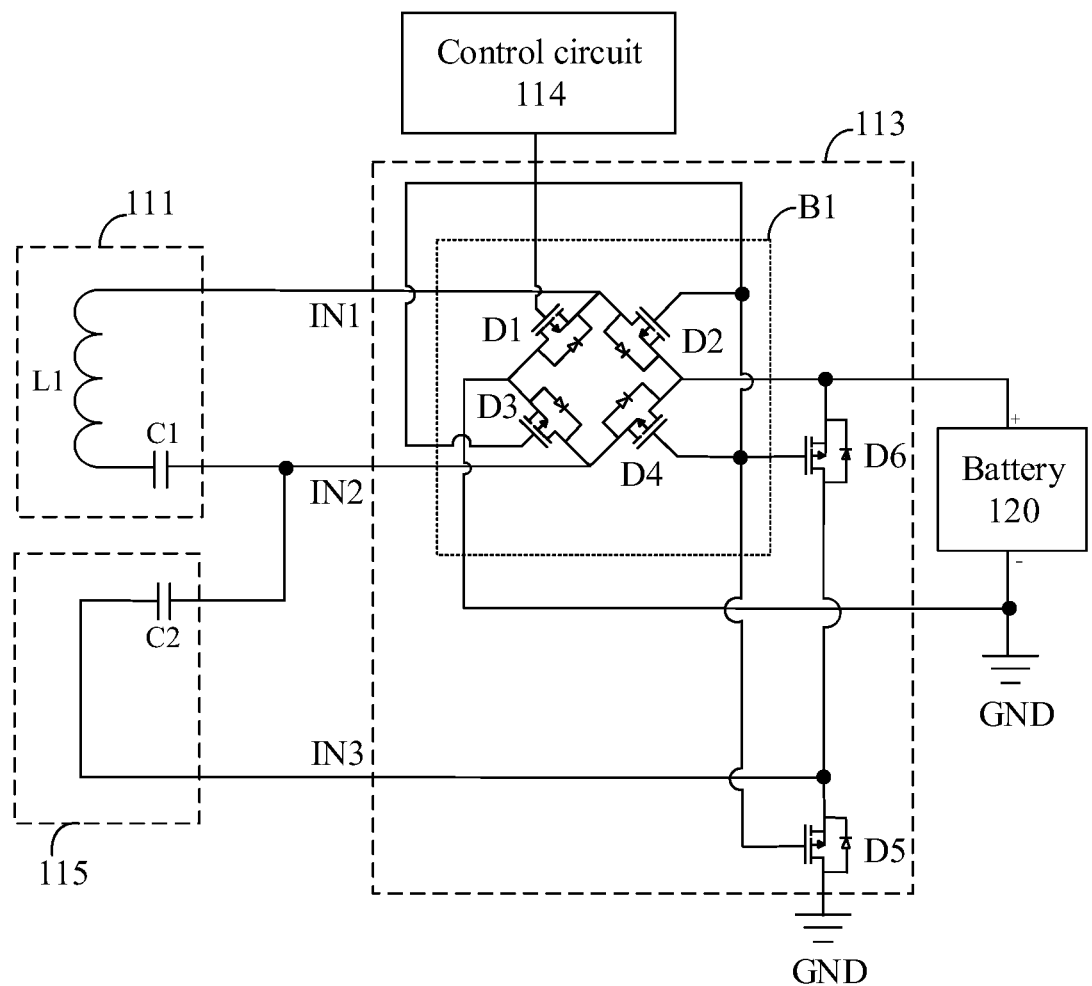
FIG. 16 is a schematic structural diagram of further another wireless charging reception circuit provided by an example of the present application.

FIG. 16 is a schematic structural diagram of further another wireless charging reception circuit provided by an example of the present application. As shown in FIG. 16, the rectifying circuit 113 may further include a sixth semiconductor device D6. A first pole of the sixth semiconductor device D6 is connected with the positive electrode of the battery 120, a second pole of the sixth semiconductor device D6 is connected with an output end of the tuning circuit 115, and a control pole of the sixth semiconductor device D6 is connected with the control circuit 114.

Since the rectifying circuit 113 may include the six semiconductor devices, the rectifying circuit 113 may be referred to as a 6-level rectifying circuit.

The control circuit 114 controls the rectifying circuit 113 to be in a following working mode:

In working mode V: the third semiconductor device D3 and the fourth semiconductor device D4 are turned off, and any one of the first semiconductor device D1, the second semiconductor device D2, the fifth semiconductor device D5 and the sixth semiconductor device D6 works according to the diode mode.

Figure 17:
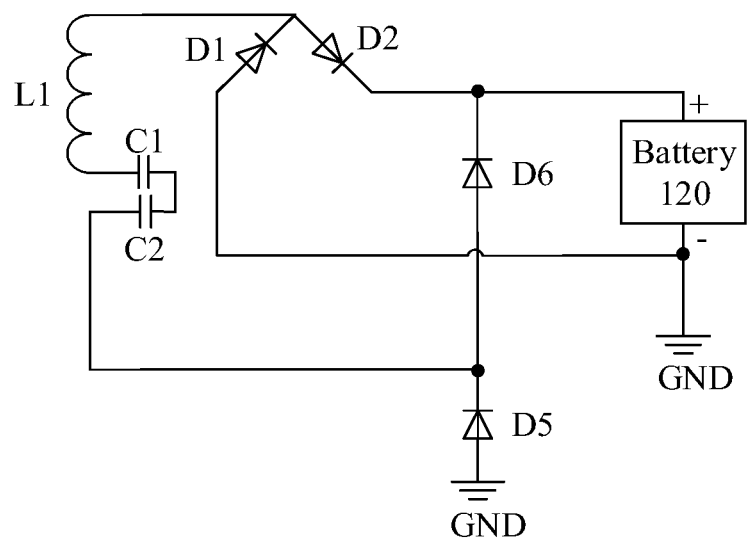
FIG. 17 is an equivalent circuit diagram of another rectifying circuit in a working mode V provided by an example of the present application.

FIG. 17 is an equivalent circuit diagram of another rectifying circuit in working mode V provided by an example of the present application. As shown in FIG. 17, in working mode V, since the first semiconductor device D1, the second semiconductor device D2 and the fifth semiconductor device D5 are all turned on, the rectifying circuit 113 rectifies the electric signal transmitted by the series resonance circuit constituted by the first resonance circuit 111 and the tuning circuit 115 in series connection.

The working principle of the rectifying circuit 113 in working mode V may refer to relevant descriptions in the above examples, which is not repeated here.

In summary, the example of the present application provides a wireless charging reception circuit, and in the wireless charging reception circuit, the control circuit can control the rectifying circuit to rectify the electric signals transmitted by the first resonance circuit or the series resonance circuit. Since the rectifying circuit outputs the different voltages after rectifying the electric signals transmitted by the different resonance circuits, the control circuit can be configured to control the rectifying circuit to rectify the electric signals transmitted by the different resonance circuits to adjust the output voltages of the rectifying circuit. The voltage gains of the wireless charging system can be flexibly adjusted, effectively improving flexibility of the wireless charging system during charging of the battery.

An example of the present application provides a wireless charging control method. The method may be applied to a control circuit in the wireless charging reception circuit provided by the above examples. As shown in FIG. 2, FIG. 3 and FIG. 9, the wireless charging reception circuit 110 further includes: a first resonance circuit 111, a second resonance circuit 112 and a rectifying circuit 113, the first resonance circuit 111 receives an electric signal transmitted by a primary resonance circuit 210 through an electromagnetic induction mode, and the second resonance circuit 112 receives the electric signal transmitted by the primary resonance circuit 210 through the electromagnetic induction mode. The method includes the control circuit outputting a control signal to the rectifying circuit so as to control the rectifying circuit to rectify an electric signal transmitted by the first resonance circuit and/or an electric signal transmitted by the second resonance circuit and charge a battery based on a rectified electric signal.

A control process of the control circuit to the rectifying circuit may refer to relevant descriptions in the apparatus examples above, which is not repeated here.

An example of the present application provides another wireless charging control method. The method may be applied to a control circuit in the wireless charging reception circuit provided by the above examples. As shown in FIG. 12, FIG. 13 and FIG. 16, the wireless charging reception circuit 110 further includes: a first resonance circuit 111, a tuning circuit 115 and a rectifying circuit 113, the first resonance circuit 111 receives an electric signal transmitted by a primary resonance circuit 210 through an electromagnetic induction mode, and the tuning circuit 115 is connected with the first resonance circuit 111 in series to form a series resonance circuit. The method includes the control circuit outputting a control signal to the rectifying circuit so as to control the rectifying circuit to rectify an electric signal transmitted by the first resonance circuit or an electric signal transmitted by the series resonance circuit and charge a battery based on a rectified electric signal.

A control process of the control circuit to the rectifying circuit may refer to relevant descriptions in the apparatus examples above, which is not repeated here.

Figure 18:
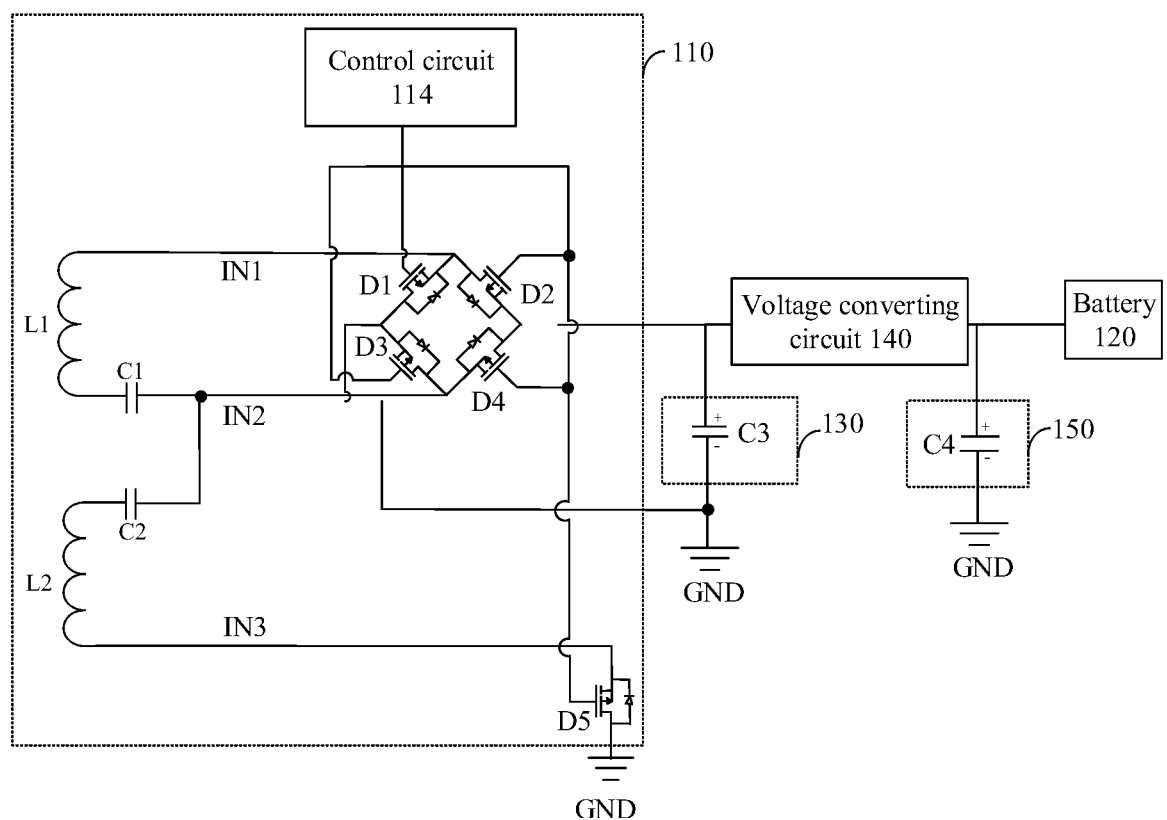
FIG. 18 is a schematic structural diagram of an electronic device provided by an example of the present application.

FIG. 18 is a schematic structural diagram of an electronic device provided by an example of the present application. As shown in FIG. 18, the electronic device 10 may include: a wireless charging reception circuit 110, a battery 120, a first filtering circuit 130, a voltage converting circuit 140 and a second filtering circuit 150. The wireless charging reception circuit 110 may be the wireless charging reception circuit provided by the above examples, such as the circuit shown in FIG. 2, FIG. 3, FIG. 9, FIG. 12 or FIG. 13.

Referring to FIG. 18, the first filtering circuit 130 is connected with an output end of a rectifying circuit 113 in the wireless charging reception circuit 110, and the first filtering circuit 130 filters an electric signal output by the rectifying circuit 113; an input end of the voltage converting circuit 140 is connected with an output end of the first filtering circuit 130, an output end of the voltage converting circuit 140 is connected with an input end of the second filtering circuit 150, and the voltage converting circuit 140 performs voltage conversion on the electric signal output by the first filtering circuit 130; and an output end of the second filtering circuit 150 is connected with a battery 120, and the second filtering circuit 150 charges the battery 120 after filtering an electric signal output by the voltage converting circuit 140.

Optionally, the voltage converting circuit 140 may be a direct/direct (DC/DC) converting circuit, and the DC/DC converting circuit may be a low drop output (LDO).

As shown in FIG. 18, the first filtering circuit 130 may include a third capacitor C3, and the second filtering circuit 150 may include a fourth capacitor C4.

Optionally, the electronic device 10 may be a mobile phone, a computer, wearable equipment, smart home equipment or a wireless charging vehicle.

An example of the present application further provides a wireless charging system. Referring to FIG. 1, the wireless charging system may include an electronic device 10 and power transmitting equipment 20. The electronic device may be the electronic device provided by the above example, such as the electronic device 10 shown in FIG. 18.

The above-described embodiments are only optional examples of the present application and do not limit the present application, and any modification, equivalent replacement, improvement, etc. made within the spirit and principle of the present application should be included in the scope of protection of the present application.

What is claimed is:

1. A wireless charging reception circuit comprises: a first resonance circuit, a second resonance circuit, a rectifying circuit and a control circuit;
   the first resonance circuit is connected with the rectifying circuit, and the first resonance circuit receives an electric signal transmitted by a primary resonance circuit through an electromagnetic induction mode and output the received electric signal to the rectifying circuit;
   the second resonance circuit is connected with the rectifying circuit, and the second resonance circuit receives an electric signal transmitted by the primary resonance circuit through an electromagnetic induction mode and output the received electric signal to the rectifying circuit; and
   the rectifying circuit, connected with the control circuit and a battery, comprises a first semiconductor device, a second semiconductor device, a third semiconductor device, a fourth semiconductor device, and the rectifying circuit rectifies the electric signal transmitted by the first resonance circuit and/or the electric signal transmitted by the second resonance circuit based on control of the control circuit and charge the battery based on a rectified electric signal,
   wherein the first semiconductor device to the fourth semiconductor device constitute a rectifier bridge,
   wherein a first input end of the rectifier bridge is connected with a first output end of the first resonance circuit, a second input end of the rectifier bridge is connected with a second output end of the first resonance circuit and a first output end of the second resonance circuit, and
   wherein a first output end of the rectifier bridge is connected with a positive electrode of the battery, and a second output end of the rectifier bridge is connected with a negative electrode of the battery.

2. The wireless charging reception circuit according to claim 1,
   wherein the first resonance circuit comprises a first induction coil and a first capacitor connected in series; the second resonance circuit comprises a second induction coil and a second capacitor connected in series, and wherein an inductance value of the first induction coil is different from an inductance value of the second induction coil.

3. The wireless charging reception circuit according to claim 1, wherein the rectifying circuit further comprises a fifth semiconductor device, wherein
a first pole of the fifth semiconductor device is connected with a second output end of the second resonance circuit,
a second pole of the fifth semiconductor device is connected with the negative electrode of the battery, and
a control pole of the fifth semiconductor device and a control pole of at least one semiconductor device in the rectifier bridge are connected with the control circuit, and the control circuit controls a working state of the connected semiconductor device.

4. The wireless charging reception circuit according to claim 3, wherein the control circuit controls the working state of the connected semiconductor device to make the rectifying circuit be in any one of following working modes:
working mode I, wherein the fifth semiconductor device is turned off, and each semiconductor device in the rectifier bridge works according to a diode mode;
working mode II, wherein the second semiconductor device and the fifth semiconductor device are turned off, the first semiconductor device is turned on, and the third semiconductor device and the fourth semiconductor device work according to the diode mode; and
working mode III, wherein the first semiconductor device and the second semiconductor device are turned off, the fifth semiconductor device is turned on, and the third semiconductor device and the fourth semiconductor device work according to the diode mode; wherein
a first pole of the first semiconductor device and a second pole of the second semiconductor device serve as the first input end of the rectifier bridge to be connected with a first output end of the first resonance circuit; a second pole of the first semiconductor device and a second pole of the third semiconductor device serve as the second output end of the rectifier bridge to be connected with the negative electrode of the battery, and
a first pole of the third semiconductor device and a second pole of the fourth semiconductor device serve as the second input end of the rectifier bridge to be connected with a second output end of the first resonance circuit and a first output end of the second resonance circuit; and a first pole of the second semiconductor device and a first pole of the fourth semiconductor device serve as the first output end of the rectifier bridge to be connected with the positive electrode of the battery.

5. The wireless charging reception circuit according to claim 3, wherein the rectifying circuit comprises a sixth semiconductor device; and
a first pole of the sixth semiconductor device is connected with the positive electrode of the battery, a second pole of the sixth semiconductor device is connected with an output end of the second resonance circuit, and a control pole of the sixth semiconductor device is connected with the control circuit.

6. The wireless charging reception circuit according to claim 5, wherein the control circuit controls the rectifying circuit to be in any one of following working modes:
working mode IV, wherein the first semiconductor device and the second semiconductor device are turned off, and any one of the third semiconductor device, the fourth semiconductor device, the fifth semiconductor device, the sixth semiconductor device works according to the diode mode; and
working mode V, wherein the third semiconductor device and the fourth semiconductor device are turned off, and any one of the first semiconductor device, the second semiconductor device, the fifth semiconductor device and the sixth semiconductor device works according to the diode mode.

7. An electronic device, comprising: the wireless charging reception circuit according to claim 1 and a battery; and wherein
the wireless charging reception circuit is connected with the battery and charges the battery.

8. The electronic device according to claim 7, wherein the electronic device further comprises: a first filtering circuit, a voltage converting circuit and a second filtering circuit;
the first filtering circuit is connected with an output end of a rectifying circuit in the wireless charging reception circuit, and the first filtering circuit filters an electric signal output by the rectifying circuit;
an input end of the voltage converting circuit is connected with an output end of the first filtering circuit, an output end of the voltage converting circuit is connected with an input end of the second filtering circuit, and the voltage converting circuit performs voltage conversion on an electric signal output by the first filtering circuit; and
an output end of the second filtering circuit is connected with the battery, and the second filtering circuit charges the battery after filtering an electric signal output by the voltage converting circuit.

9. A wireless charging system, comprising: power transmitting equipment and the electronic device according to claim 7; wherein
the power transmitting equipment comprises a primary resonance circuit, and the primary resonance circuit transmits an electric signal to a resonance circuit in the electronic device through an electromagnetic induction mode.

10. A wireless charging reception circuit, wherein the wireless charging reception circuit comprises: a first resonance circuit, a tuning circuit, a rectifying circuit and a control circuit;
the first resonance circuit is connected with the rectifying circuit, and the first resonance circuit receives an electric signal transmitted by a primary resonance circuit through an electromagnetic induction mode and output the received electric signal to the rectifying circuit;
the tuning circuit is connected with the first resonance circuit and the rectifying circuit, and the tuning circuit is connected with the first resonance circuit in series to form a series resonance circuit; and
the rectifying circuit, connected with the control circuit and a battery, comprises a first semiconductor device, a second semiconductor device, a third semiconductor device, a fourth semiconductor device, and the rectifying circuit rectifies an electric signal transmitted by the first resonance circuit or an electric signal transmitted by the series resonance circuit based on control of the control circuit and charge the battery based on a rectified electric signal,
wherein the first semiconductor device to the fourth semiconductor device constitute a rectifier bridge,
wherein a first input end of the rectifier bridge is connected with a first output end of the first resonance circuit, a second input end of the rectifier bridge is connected with a second output end of the first resonance circuit and a first output end of the second resonance circuit, and
wherein a first output end of the rectifier bridge is connected with a positive electrode of the battery, and a second output end of the rectifier bridge is connected with a negative electrode of the battery.

11. The wireless charging reception circuit according to claim 10, wherein the first resonance circuit comprises a first induction coil and a first capacitor connected in series; and the tuning circuit comprises a second induction coil or a second capacitor.

12. The wireless charging reception circuit according to claim 10, wherein the rectifying circuit further comprises a fifth semiconductor device, wherein
a first pole of the fifth semiconductor device is connected with a second output end of the tuning circuit;
a second pole of the fifth semiconductor device is connected with the negative electrode of the battery; and
a control pole of the fifth semiconductor device and a control pole of at least one semiconductor device in the rectifier bridge are connected with the control circuit, and the control circuit controls a working state of the connected semiconductor device.

13. The wireless charging reception circuit according to claim 12, wherein the control circuit controls the working state of the connected semiconductor device to make the rectifying circuit be in following working modes:
working mode I, wherein the fifth semiconductor device is turned off, and each semiconductor device in the rectifier bridge works according to a diode mode,
working mode II, wherein the second semiconductor device and the fifth semiconductor device are turned off, the first semiconductor device is turned on, and the third semiconductor device and the fourth semiconductor device work according to the diode mode, and
working mode VI, wherein the third semiconductor device and the fourth semiconductor device are turned off, the fifth semiconductor device is turned on, and the first semiconductor device and the second semiconductor device work according to the diode mode; wherein
a first pole of the first semiconductor device and a second pole of the second semiconductor device serve as the first input end of the rectifier bridge to be connected with a first output end of the first resonance circuit; a second pole of the first semiconductor device and a second pole of the third semiconductor device serve as the second output end of the rectifier bridge to be connected with the negative electrode of the battery, and
a first pole of the third semiconductor device and a second pole of the fourth semiconductor device serve as the second input end of the rectifier bridge to be connected with a second output end of the first resonance circuit and a first output end of the tuning circuit; and a first pole of the second semiconductor device and a first pole of the fourth semiconductor device serve as the first output end of the rectifier bridge to be connected with the positive electrode of the battery.

14. The wireless charging reception circuit according to claim 12, wherein the rectifying circuit comprises a sixth semiconductor device; and
a first pole of the sixth semiconductor device is connected with the positive electrode of the battery, a second pole of the sixth semiconductor device is connected with an output end of the tuning circuit, and a control pole of the sixth semiconductor device is connected with the control circuit.

15. The wireless charging reception circuit according to claim 14, wherein the control circuit controls the rectifying circuit to be in a following working mode:
working mode V, wherein the third semiconductor device and the fourth semiconductor device are turned off, and any one of the first semiconductor device, the second semiconductor device, the fifth semiconductor device and the sixth semiconductor device works according to the diode mode.

16. A wireless charging control method, applied to a control circuit in a wireless charging reception circuit, wherein the wireless charging reception circuit comprises: a first resonance circuit, a second resonance circuit and a rectifying circuit, the first resonance circuit receives an electric signal transmitted by a primary resonance circuit through an electromagnetic induction mode, and the second resonance circuit receives the electric signal transmitted by the primary resonance circuit through the electromagnetic induction mode; wherein the rectifying circuit comprises a first semiconductor device, a second semiconductor device, a third semiconductor device, a fourth semiconductor device, and the first semiconductor device to the fourth semiconductor device constitute a rectifier bridge; wherein a first input end of the rectifier bridge is connected with a first output end of the first resonance circuit, a second input end of the rectifier bridge is connected with a second output end of the first resonance circuit and a first output end of the second resonance circuit; and a first output end of the rectifier bridge is connected with a positive electrode of a battery, and a second output end of the rectifier bridge is connected with a negative electrode of the battery;
and the method comprises:
outputting, by the control circuit, a control signal to the rectifying circuit so as to control the rectifying circuit to rectify an electric signal transmitted by the first resonance circuit and/or an electric signal transmitted by the second resonance circuit and charge a battery based on a rectified electric signal.

17. A wireless charging control method, applied to a control circuit in a wireless charging reception circuit, wherein the wireless charging reception circuit comprises: a first resonance circuit, a tuning circuit and a rectifying circuit, the first resonance circuit receives an electric signal transmitted by a primary resonance circuit through an electromagnetic induction mode, and the tuning circuit is connected with the first resonance circuit in series to form a series resonance circuit; wherein the rectifying circuit comprises a first semiconductor device, a second semiconductor device, a third semiconductor device, a fourth semiconductor device, and the first semiconductor device to the fourth semiconductor device constitute a rectifier bridge; wherein a first input end of the rectifier bridge is connected with a first output end of the first resonance circuit, a second input end of the rectifier bridge is connected with a second output end of the first resonance circuit and a first output end of the second resonance circuit; and a first output end of the rectifier bridge is connected with a positive electrode of the battery, and a second output end of the rectifier bridge is connected with a negative electrode of the battery;
and the method comprises:
outputting, by the control circuit, a control signal to the rectifying circuit so as to control the rectifying circuit to rectify an electric signal transmitted by the first resonance circuit or an electric signal transmitted by the series resonance circuit and charge a battery based on a rectified electric signal.

* * * * *

UNITED STATES PATENT AND TRADEMARK OFFICE
CERTIFICATE OF CORRECTION

PATENT NO. : 12,334,747 B2
APPLICATION NO. : 17/587692
DATED : June 17, 2025
INVENTOR(S) : Kaiqi Wu Page 1 of 1

It is certified that error appears in the above-identified patent and that said Letters Patent is hereby corrected as shown below:

On the Title Page

In Item (54), in Title, in Column 1, Line 5, delete "ELECTROMAGENTIC" and insert
-- ELECTROMAGNETIC --, therefor.

In the Specification

In Column 1, in Title, Line 5, delete "ELECTROMAGENTIC" and insert
-- ELECTROMAGNETIC --, therefor.
In Column 10, Line 16, delete "cannot" and insert -- can not --, therefor.

Signed and Sealed this
Nineteenth Day of August, 2025

Coke Morgan Stewart
*Acting Director of the United States Patent and Trademark Office*